T. P. DOOLE.
WHEELED STRETCHER OR LITTER.
APPLICATION FILED SEPT. 3, 1915.
1,205,867.
Patented Nov. 21, 1916.
2 SHEETS—SHEET 1.
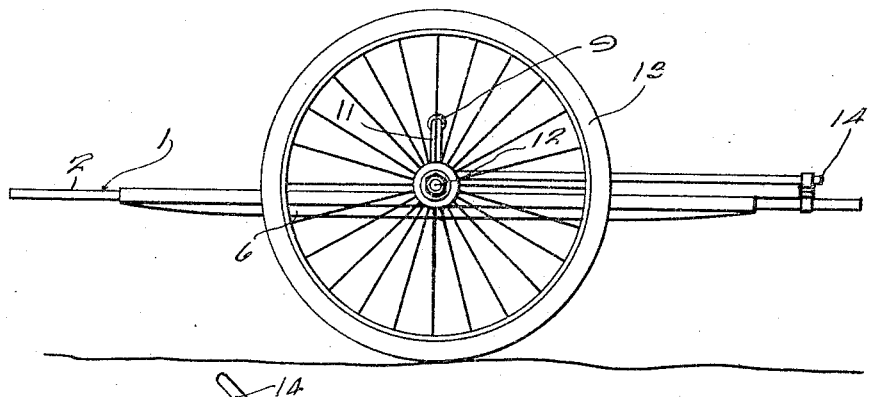
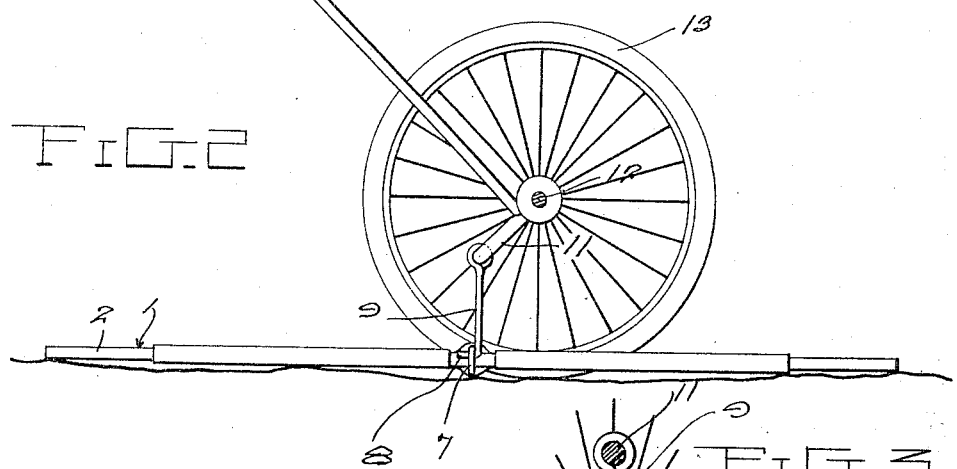
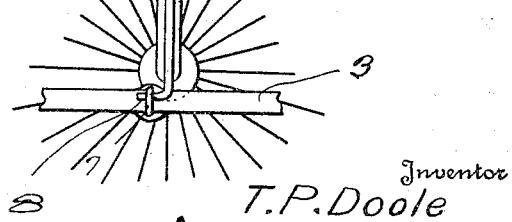
Inventor
T. P. Doole

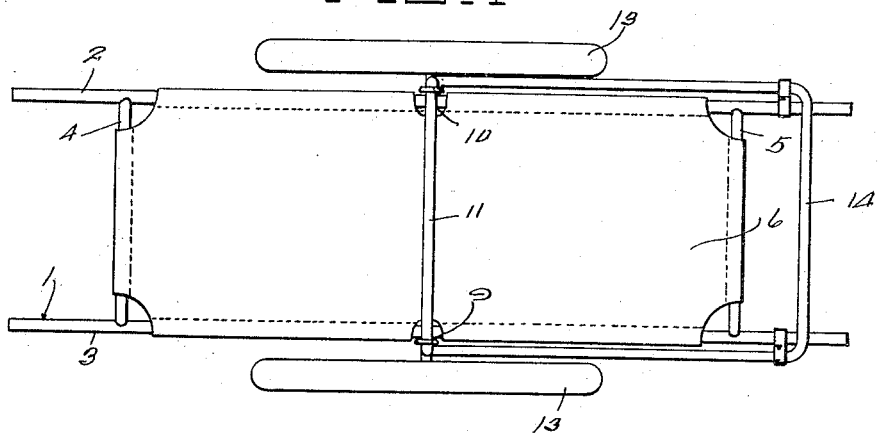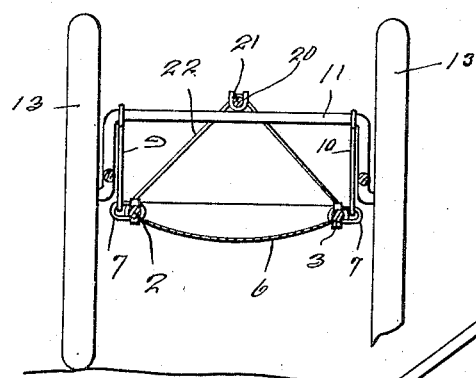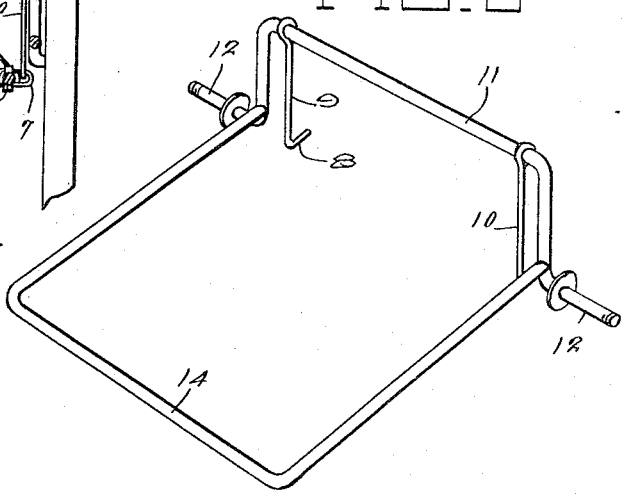

UNITED STATES PATENT OFFICE.

THOMAS P. DOOLE, OF EAGLE LAKE, TEXAS.

WHEELED STRETCHER OR LITTER.

1,205,867.  Specification of Letters Patent.  Patented Nov. 21, 1916.

Application filed September 3, 1915. Serial No. 48,909.

*To all whom it may concern:*

Be it known that I, THOMAS P. DOOLE, a citizen of the United States, residing at Eagle Lake, in the county of Colorado and State of Texas, have invented certain new and useful Improvements in Wheeled Stretchers or Litters; and I do hereby declare the following to be a full, clear, and exact description of the invention, such as will enable others skilled in the art to which it appertains to make and use the same.

This invention relates to a wheeled stretcher or litter particularly designed for use in the transportation of wounded soldiers on a field of battle, and the primary object of the invention is to provide a wheeled litter as specified, wherein the transportation of a wounded soldier or man may be carried out by one man, eliminating the necessity of the employment of two men to carry the litter or stretcher, and also materially decreasing the amount of labor necessary for the transportation of the litter, as well as eliminating the necessity of the employment of an ambulance, team and driver for transporting the sick or wounded from barracks to a post hospital.

Another object of this invention is to provide a truck structure, which is particularly designed, so that a single operator may lift a stretcher or litter containing a sick or wounded comrade, off the ground, ready for transportation by himself, the frame of the truck being constructed to impart a leverage action, which materially decreases the labor contingent with the lifting of the laden litter from the ground.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of the improved wheeled litter or stretcher. Fig. 2 is a side elevation, showing one wheel removed and showing the truck in a position prior to the lifting of a stretcher or litter off the ground and into a position for transportation. Fig. 3 is a fragmentary sectional view, showing one of the litter engaging hooks of the truck structure. Fig. 4 is a top plan view of the wheeled stretcher or litter. Fig. 5 is a cross sectional view through the wheeled stretcher or litter, showing a modification applied thereto, and Fig. 6 is a perspective view of the frame structure of the truck.

Referring more particularly to the drawings, 1 designates a litter or stretcher of ordinary construction, such as is used for the transportation of a wounded or sick soldier from a field of battle, and which is composed of longitudinally extending side rails 2 and 3, cross rails 4 and 5. A canvas or flexible bottom 6 is secured to the frame-work of the stretcher and is provided for supporting the wounded or ill patient. The side rails 2 and 3 of the stretcher have eyes 7 connected thereto substantially equidistant of their ends, which eyes 7 may be either eye-bolts or U-shaped bolts, as desired. The eyes are rigidly attached to the side rails of the stretcher and are provided for receiving the angled ends 8 of hooks 9 and 10. The hooks 9 and 10 are swingably supported by an arch axle 11 of the truck structure. The arch axle 11 of the truck structure has spindles 12 formed upon its ends, upon which supporting wheels 13 are mounted. The supporting wheels 13 may be constructed in any desired form, preferably being wheels having wire spokes and rubber tires, either cushion or pneumatic, as desired. If it is desired, the rubber or cushioning tires may be dispensed with, or the wheels may be provided with either roller or ball bearings, without departing from the spirit of this invention.

The arch axle 11 has a U-shaped handle structure 14 formed thereupon and projecting from the legs of the arch axle, adjacent to the commencement of the spindles 12. The handle 14 extends transversely to the arch axle 11, and may be formed upon or secured to the axle, as desired.

In the operation of the improved wheeled stretcher; the stretcher 1 may be placed upon the ground, and the wounded or ill person placed upon the stretcher, after which the truck structure may be moved over the stretcher, so that the wheels will be positioned along side of the side rails of the stretcher, after which the arch axle and the handle are moved to a position, as shown in Fig. 2 of the drawings, in which position the angled ends 8 of the hooks 9 are in alinement with the eyes 7 carried by the side rails of the stretcher or litter. The forward movement of the truck will cause the angled ends 8 of the hooks 9 to pass into the eyes, after which an upward and rearward movement of the handle, in a swinging manner, will lift the stretcher, free of the ground, and support the same by the hooks 9 and the arch axle 11, in the manner shown in Fig. 1 of the drawings, at which time the litter is ready for transportation.

In Fig. 5 of the drawings, a clip 20 is shown attached to the upper portion of the arch axle centrally of its ends. The clip 20 supports a rod 21 which extends longitudinally of the stretcher, and centrally of its ends, above its upper surface. A canvas or other fabric sheet, indicated by the numeral 22, may be placed on the rod and draped over the edges of the stretcher for inclosing the same and protecting the occupant of the stretcher against exposure to the weather conditions.

From the foregoing description taken in connection with the accompanying drawings, it will be seen that a wheeled stretcher or litter for army use has been provided, which will materially decrease the amount of labor necessary for transporting wounded or sick men from a battle field or from barracks to a hospital, as well as a litter which may be used for transporting large quantities of surgical and medical supplies, thereby relieving largely supply wagons and encumbrances of the road.

By loading extra litters on to the litter attached to the wheeled carrier or truck, enough litters can be placed on the field to keep one man busy loading litters, while another can return to the rear with the wheeled stretcher, thereby clearing a field more rapidly than the way in which it is now done.

In reducing the invention to practice, certain minor features of construction, combination, and arrangement of parts may necessitate alteration, to which the patentee is entitled, provided such alterations are comprehended within the scope of what is claimed.

What is claimed is:—

In a wheeled litter or stretcher structure, the combination, of a truck structure including a substantially inverted U-shaped arch axle, spindles formed upon and extending outwardly from the free ends of the legs of said axle, a substantially U-shaped handle formed upon said axle and extending outwardly substantially at right angles to the axle from points a short distance above said spindles, supporting wheels mounted upon said spindles, hooks pivotally mounted upon the bight portion of said axle, an ordinary stretcher structure including side rails, eyes carried by said side rails and adapted for receiving the hook portions of said hooks for connecting the stretcher to the truck structure.

In testimony whereof I affix my signature in presence of two witnesses.

THOMAS P. DOOLE.

Witnesses:
NONA FORBES,
P. T. GORDON.

Copies of this patent may be obtained for five cents each, by addressing the "Commissioner of Patents Washington, D. C."